United States Patent
Oosaki et al.

(10) Patent No.: US 9,850,371 B2
(45) Date of Patent: Dec. 26, 2017

(54) METHODS FOR PRODUCING RESIN FILM AND LAYERED ARTICLE

(75) Inventors: Nobuhiro Oosaki, Sodegaura (JP); Jinsho Nambu, Kamakura (JP); Taiichi Sakaya, Chiba (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 284 days.

(21) Appl. No.: 12/502,391

(22) Filed: Jul. 14, 2009

(65) Prior Publication Data

US 2009/0274843 A1 Nov. 5, 2009

Related U.S. Application Data

(63) Continuation of application No. 11/603,152, filed on Nov. 22, 2006, now abandoned.

(30) Foreign Application Priority Data

Nov. 30, 2005 (JP) .................................. 2005-345218

(51) Int. Cl.
  B05D 3/04 (2006.01)
  C08L 29/04 (2006.01)
  C08J 5/18 (2006.01)
  C08L 29/06 (2006.01)
  C08L 33/02 (2006.01)

(52) U.S. Cl.
  CPC ............. C08L 29/04 (2013.01); C08J 5/18 (2013.01); C08L 29/06 (2013.01); C08J 2329/04 (2013.01); C08L 33/02 (2013.01); C08L 2205/03 (2013.01)

(58) Field of Classification Search
  CPC .......... C08L 29/04; C08L 29/06; C08L 33/02; C08L 2205/03; C08L 2666/04; C08L 2666/02; C08J 5/18; C08J 2329/04
  USPC ............................................... 427/384, 377
  See application file for complete search history.

(56) References Cited

U.S. PATENT DOCUMENTS

| 4,770,944 A * | 9/1988 | Farrell et al. ............... 428/474.4 |
| 5,498,662 A | 3/1996 | Tanaka et al. |
| 5,552,479 A | 9/1996 | Tanaka et al. |
| 5,574,096 A | 11/1996 | Tanaka et al. |
| 5,981,029 A * | 11/1999 | Harada et al. ................ 428/143 |
| 6,022,913 A | 2/2000 | Tanaka et al. |
| 6,143,384 A | 11/2000 | Tanaka et al. |
| 6,605,344 B1 | 8/2003 | Ohba et al. |
| 2003/0096101 A1 | 5/2003 | Kazeto |

FOREIGN PATENT DOCUMENTS

| EP | 1 203 791 A1 | 5/2002 |
| JP | 8-41218 A | 2/1996 |
| JP | 10-237180 A | 9/1998 |
| JP | 11-246729 A | 9/1999 |
| JP | 2001-40162 A | 2/2001 |
| JP | 2004-238605 A | 8/2004 |

OTHER PUBLICATIONS

L. E. Nielsen, Models for the Permeability of Filled Polymer Systems, J. Macromol. Sci. (Chem)., 1967, 929-942, A1(5).

* cited by examiner

*Primary Examiner* — Robert S Walters, Jr.
(74) *Attorney, Agent, or Firm* — Sughrue Mion, PLLC

(57) ABSTRACT

Methods for producing a resin film or a layered article which are excellent in gas barrier properties under high humidity conditions are disclosed. In the methods, a precursor film of a resin composition composed of alkali metal ions and a resin component having both hydroxyl groups and carboxyl groups is subjected to treatments including (i) dry heating treatment of holding the precursor film under an atmosphere characterized by a temperature not lower than 100° C. and a water vapor concentration less than 50 g/m$^3$, (ii) wet heating treatment of holding the precursor film resulting from the dry heating treatment under an atmosphere characterized by a temperature not lower than 100° C. and a water vapor concentration more than 290 g/m$^3$ or in water at a temperature not lower than 80° C., and (iii) drying the precursor film resulting from the wet heating treatment.

10 Claims, No Drawings

METHODS FOR PRODUCING RESIN FILM AND LAYERED ARTICLE

This application is a continuation of Ser. No. 11/603,152 filed Nov. 22, 2006 now abandoned, and claims benefit to Japanese Patent Application No. 2005-345218 filed Nov. 30, 2005, the disclosures of which are all hereby incorporated by reference in their entirety.

BACKGROUND OF THE INVENTION

1. Field of the Invention

The present invention relates to methods for producing resin films or layered articles which exhibit excellent gas barrier properties under high humidity conditions.

2. Description of the Related Art

Films made of polyvinyl alcohol are known to have good gas barrier properties and are used widely in wrapping material applications and the like. Unfortunately, the gas barrier properties of such films of polyvinyl alcohol depend on humidity so greatly that gas barrier properties of such films will deteriorate under high humidity conditions. As a solution of such a problem, U.S. Pat. No. 5,552,479 discloses a method for producing a gas barrier film by heat treating, under specific conditions, a film formed from a mixture of polyvinyl alcohol and poly(meth)acrylic acid.

Films produced by the above-mentioned method have somewhat improved gas barrier properties under high humidity conditions in comparison to films before heat treatment, but their performances are not satisfactory yet.

SUMMARY OF THE INVENTION

The object of the present invention is to offer a method for producing a resin film having good gas barrier properties under high humidity conditions and a method for producing a layered article including such a resin film and a substrate.

Namely, the present invention is, in a first aspect, a method for producing a resin film, comprising subjecting a precursor film (D) made of a resin composition (C) which comprises a resin component (A) with hydroxyl groups and carboxyl groups and alkali metal ions (B) and satisfies conditions (1) and (2) given below to the following treatments:

dry heating treatment comprising holding the precursor film under an atmosphere characterized by a temperature not lower than 100° C. and a water vapor concentration less than 50 g/m$^3$, wet heating treatment comprising holding the precursor film resulting from the dry heating treatment under an atmosphere characterized by a temperature not lower than 100° C. and a water vapor concentration more than 290 g/m$^3$ or in water at a temperature not lower than 80° C., and drying the precursor film resulting from the wet heating treatment:

condition (1): the ratio of the number of the hydroxyl groups to the number of the carboxyl groups in the resin component (A) is from 30:70 to 95:5 (hydroxyl groups: carboxyl groups), condition (2): the weight of the alkali metal ions (B) contained in the resin composition (C) is from 0.2% to 5% of the weight of the resin component (A).

Further, the present invention is, in a second aspect, a method for producing a layered structure comprising a resin film and a substrate having thereon the resin film, comprising:

applying a liquid to a substrate, the liquid having been prepared by dispersing a resin composition (C) which comprises a resin component (A) with hydroxyl groups and carboxyl groups and alkali metal ions (B) and satisfies conditions (1) and (2) given below in a solvent, removing the solvent from the applied liquid to form a precursor film (D') on the substrate, and subjecting the precursor film (D') to the following treatments together with the substrate:

dry heating treatment comprising holding the precursor film under an atmosphere characterized by a temperature not lower than 100° C. and a water vapor concentration less than 50 g/m$^3$, wet heating treatment comprising holding the film resulting from the dry heating treatment under an atmosphere characterized by a temperature not lower than 100° C. and a water vapor concentration more than 290 g/m$^3$ or in water at a temperature not lower than 80° C., and drying the film resulting from the wet heating treatment:

condition (1): the ratio of the number of the hydroxyl groups to the number of the carboxyl groups in the resin component (A) is from 30:70 to 95:5 (hydroxyl groups: carboxyl groups), condition (2): the weight of the alkali metal ions (B) contained in the resin composition (C) is from 0.2% to 5% of the weight of the resin component (A).

Since the method of the second aspect is an application of the method of the first aspect, desirable conditions for the method of the first aspect are preferably applied also to the method of the second aspect.

By use of the method for producing of a resin film of the present invention, it is possible to obtain a resin film which is excellent in gas barrier properties under high humidity conditions. Further, by use of the method for producing of a layered article of the present invention, it is possible to obtain a layered article which is excellent in gas barrier properties under high humidity conditions.

DESCRIPTION OF THE PREFERRED EMBODIMENTS

The resin composition (C) contains alkali metal ions (B) and a resin component (A) having hydroxyl groups and carboxyl groups and the resin composition satisfies the following conditions (1) and (2):

condition (1): the ratio of the number of the hydroxyl groups to the number of the carboxyl groups in the resin component (A) is from 30:70 to 95/5 (hydroxyl groups: carboxyl groups), condition (2): the weight of the alkali metal ions (B) contained in the resin composition (C) is from 0.2% to 5% (i.e. from 2,000 ppm to 50,000 ppm) of the weight of the resin component (A).

The resin component (A) having hydroxyl groups and carboxyl groups may be a resin component (A1) having both hydroxyl groups and carboxyl groups in one molecule or alternatively may be a resin component including a resin component (A2) having hydroxyl groups and a resin component (A3) having carboxyl groups. Here, the term "hydroxyl group" means a so-called "alcoholic hydroxyl group" and does not include a hydroxyl group in a carboxyl group. Examples of the resin component (A1) include vinyl alcohol-acrylic acid copolymers and vinyl alcohol-methacrylic acid copolymers. Examples of the resin component (A2) having hydroxyl groups include polyvinyl alcohols, partially saponified polyvinyl alcohols and polysaccharides. Examples of the resin component (A3) having carboxyl groups include polyacrylic acids, polymethacrylic acids, partially neutralized polyacrylic acids and partially neutralized polymethacrylic acids.

As the resin component (A2) having hydroxyl groups, polyvinyl alcohols are most preferable due to their satisfactory solubilities in aqueous solvents, easiness of handling and gas barrier properties of resulting resin films. The "polyvinyl alcohol" refers to a polymer predominantly comprising monomer units of vinyl alcohol. Examples of such "polyvinyl alcohol" include polymers obtained by subjecting acetic acid portions of vinyl acetate polymers to hydrolysis, and polymers obtained by hydrolyzing a polymer such as vinyl trifluoroacetate polymer, vinyl formate polymer, vinyl pivalate polymer, tert-butyl vinyl ether polymer and trimethylsilyl vinyl ether polymer. As to the details of the "polyvinyl alcohol", a book entitled "PVA No Sekai (World of PVA)" edited by POVAL-KAI (POVAL Society), (1992), published by KOBUNSHI KANKO-KAI (Polymer Publishing Society) K.K.; and a book entitled "Poval" written by Nagano et al. (1981), published by KOBUNSHI KANKO-KAI may be referred to. The degree of saponification of the ester portions of a polymer is preferably not less than 70 mol %, more preferably not less than 85 mol % and even more preferably not less than 98 mol %. A polymer having a degree of saponification of 98 mol % or more is called a "perfectly saponified polymer." The degree of polymerization of a polyvinyl alcohol for use in the present invention is preferably from 100 to 5,000, and more preferably from 200 to 3,000.

The polyvinyl alcohol may have functional groups other than hydroxyl groups. Examples of such functional groups include amino group, thiol group, carboxyl group, sulfone group, phosphate group, carboxylate group, sulfonic acid ion group, phosphate ion group, ammonium group, phosphonium group, silyl group, siloxane group, alkyl group, allyl group, fluoroalkyl group, alkoxy group, carbonyl group and halogen group.

The resin component (A3) having carboxyl groups preferably comprises at least one species selected from polyacrylic acids, polymethacrylic acids, partially neutralized polyacrylic acids and partially neutralized polymethacrylic acids. Copolymers of acrylic acid and methacrylic acid may also be used. The weight-average molecular weight of the resin component (A3) having carboxyl groups preferably falls within the range of from 2,000 to 1,000,000, and more preferably within the range of from 100,000 to 1,000,000.

The aforementioned partially neutralized polyacrylic acids or partially neutralized polymethacrylic acids can be obtained through addition of an alkali to an aqueous solution of polyacrylic acid or polymethacrylic acid. It is possible to obtain a desired degree of neutralization by adjusting the ratio of the amount of polyacrylic acid or polymethacrylic acid to the amount of alkali. Here, the degree of neutralization of a polyacrylic acid or polymethacrylic acid is defined by the formula provided below. From the viewpoint of gas barrier properties and transparency of a resulting resin film, the partially neutralized polyacrylic acids and partially neutralized polymethacrylic acids preferably have degrees of neutralization of from 0.1% to 20%.

Degree of neutralization=$(A/B) \times 100$

A: The molar number of neutralized carboxyl groups contained in a one-gram portion of polyacrylic acid or polymethacrylic acid.

B: The molar number of carboxyl groups contained in a one-gram portion of polyacrylic acid or polymethacrylic acid before neutralization.

The ratio of the number of the hydroxyl groups to the number of the carboxyl groups in the resin component (A) is from 30:70 to 95:5, and preferably from 70:30 to 95:5. From the viewpoint of gas barrier properties under high humidity conditions of a resulting resin film, the combined weight of the hydroxyl groups and the carboxyl groups in the resin component (A) is preferably from 30 to 60%, more preferably from 35 to 55%, of the weight of the resin component (A).

The ratio of the number of the hydroxyl groups to the number of the carboxyl groups in the resin component (A) can be determined by an NMR method, an IR method, or the like. For example, in the IR method, a working curve is produced by using samples each having a known ratio of the number of hydroxyl groups to the number of carboxyl groups. The ratio of the number of hydroxyl groups to the number of carboxyl groups of an unknown sample can be calculated by using the working curve. In the case of using a vinyl alcohol homopolymer and an acrylic acid homopolymer and/or a methacrylic acid homopolymer, the ratio of the number of hydroxyl groups to the number of carboxyl groups in the combined portion of the polymers can be calculated from the molar numbers of hydroxyl groups and carboxyl groups in each polymer determined in advance on the basis of the weight of each polymer. Like the ratio of the number of hydroxyl groups to the number of carboxyl groups, the combined weight of hydroxyl groups and carboxyl groups in the resin component (A) can be determined by an NMR method, an IR method or the like. For example, in the IR method, working curves are produced by using polyol polymers each having a known number of polyol units and polycarboxylic acids each having a known number of polycarboxylic acid units. The combined weight of hydroxyl groups to carboxyl groups in an unknown sample can be calculated by using the working curves. In the case of using a vinyl alcohol homopolymer and an acrylic acid homopolymer and/or a methacrylic acid homopolymer, the combined weight of hydroxyl groups and carboxyl groups in the combined portion of the polymers can be calculated from the weights of hydroxyl groups and carboxyl groups in each polymer determined in advance on the basis of the weight of each polymer.

Examples of the kind of alkali metal ions (B) contained in the resin composition (C) include sodium ion, lithium ion and potassium ion. The weight of the alkali metal ions (B) contained in the resin composition (C) is from 0.2% to 5% (namely, from 2,000 ppm to 50,000 ppm), preferably, from 0.2% to 2% (namely, 2,000 ppm to 20,000 ppm), of the weight of the resin component (A).

The alkali metal ions (B) usually originate in alkali metal ion-donating compounds. Therefore, the resin composition (C) usually contains alkali metal ion-donating compounds. Examples of such alkali metal ion-donating compounds include sodium hydroxide, sodium hypophosphite, lithium hydroxide, potassium hydroxide and clay minerals containing alkali metal ion. Two or more kinds of alkali metal ion-donating compounds may be used together.

Clay minerals are typically laminar compounds. From the viewpoint of gas barrier properties of a resulting resin film, it is desirable to use clay mineral as the alkali metal ion-donating compounds. Examples of such clay mineral include montmorillonite, beidellite, nontronite, saponite, sauconite, stevensite, hectorite, tetrasilylic mica, sodium taeniolite, muscovite and phlogopite. So-called "organically modified clay minerals" obtained by subjecting clay minerals such as those mentioned above to treatment like ion exchange with an organic substance also may be used as the alkali metal ion-donating compounds. "Organically modified clay minerals" are explained in detail in Masahiro MAENO, "Nendo No Kagaku (Science of Clay)" pp. 174-181, 1993, The Nikkan Kogyo Shimbun, Ltd. As the organic substance for treating clay minerals, quaternary ammonium salts such as dimethyldistearyl ammonium salt and trimethylstearyl ammonium salt, phosphonium salts, imidazolium salts, etc. may be used.

From the viewpoint of gas barrier properties of a resulting resin film under high humidity conditions, the alkali metal ions are preferably sodium ions and a sodium ion donating compound which donates a sodium ion is preferably a sodium ion-containing clay mineral. Particularly, montmorillonite is preferably used.

The clay mineral to be used as an alkali metal ion-donating compound preferably has an aspect ratio falling within the range of from 200 to 3,000. When the aspect ratio is too small, gas barrier properties tend to become insufficient. When the aspect ratio is too large, it becomes difficult to swell and cleave the clay mineral with a solvent, resulting in insufficient gas barrier properties. The clay mineral to be used preferably has an average particle diameter up to 5 µm. When the average particle diameter is too large, the gas barrier properties and transparency of a resulting film and the film forming property of a resulting resin composition tend to become poor. Particularly in the production of products to be used in applications where high transparency is required, the average particle diameter of the clay mineral is preferably up to 1 µm.

In the present invention, the aspect ratio (Z) of a clay mineral is defined by the formula: $Z=L/a$. In the formula, "L" is an average particle diameter of the clay mineral and "a" indicates the unit thickness of the clay mineral, i.e., the thickness of a unit crystal layer of the clay mineral. The thickness can be determined by the powder X-ray diffraction method (see a book entitled "Kiki-Bunseki No Tebiki (Handbook on Instrumental Analysis) (a)", page 69, (1985), editorially supervised by Jiro SHIOKAWA, published by Kagakku Dojin Publishing Co.).

The clay mineral to be used in the present invention preferably has a swell value, determined by a swellability test described below, of 5 or more, more preferably 20 or more. Further, the clay mineral preferably has a cleavage value, determined by a cleavability test described below, of 5 or more, more preferably 20 or more.

<Swellability Test>

In a 100-ml graduated cylinder, 100 ml of liquid medium is charged, and 2 g of clay mineral is added thereto. Through keeping of the mixture at rest at 23° C. for 24 hours, the mixture separates into a clay mineral dispersion layer and a supernatant layer. Then, the volume in milliliter of the clay mineral dispersion layer in the graduated cylinder is read from the graduation at the interface between the clay mineral dispersion layer and the supernatant liquid. The larger the value (swell value), the higher the swellability.

<Cleavability Test>

Thirty grams of clay mineral is added slowly to 1,500 ml of a solvent and is dispersed by means of a dispersing instrument (DESPA MH-L manufactured by Asada Iron Works Co., Ltd.; vane diameter of 52 mm; rotation speed: 3,100 rpm; container capacity: 3 liters; clearance between the bottom of the container and the vane: 28 mm) with a peripheral speed of 8.5 m/sec at 23° C. for 90 minutes. Thereafter, a 100-ml portion of the resulting dispersion is poured into a graduated cylinder and is kept at rest for 60 minutes. Thus, the dispersion separates into a clay mineral dispersion layer and a supernatant layer. Then, the volume of the clay mineral dispersion layer is read from the graduation at the interface between the clay mineral dispersion layer and the supernatant layer. The larger the value (cleavage value), the higher the cleavability.

In the case where the clay mineral is a hydrophilic swellable clay mineral, examples of the solvent to be used for swelling and cleaving clay mineral include water, alcohols (e.g. methanol, ethanol, propanol, isopropanol, ethylene glycol, diethylene glycol, etc.), dimethylformamide, dimethylsulfoxide and acetone. Water, alcohols and mixtures of water and alcohol are preferred.

In the case where the clay mineral is an organically modified clay mineral, liquid medium may be used, for example, aromatic hydrocarbons such as benzene, toluene and xylene, ethers such as ethyl ether and tetrahydrofuran, ketone such as acetone, methyl ethyl ketone and methyl isobutyl ketone, aliphatic hydrocarbons such as n-pentane, n-hexane and n-octane, halogenated hydrocarbons such as chlorobenzene, carbon tetrachloride, chloroform, dichloromethane, 1,2-dichloroethane and perchloroethylene, ethyl acetate, methyl methacrylate, dioctyl phthalate, dimethylformamide, dimethylsulfoxide, methylcellosolve and silicone oil.

The resin composition (C) may contain various types of additives such as UV absorbers, colorants and antioxidants in addition to the resin component (A) and the alkali metal ions (B).

Examples of a method for preparing the resin composition (C) include a method comprising melt-kneading a resin component (A) and an alkali metal ion-donating compound, a method comprising dissolving or dispersing a resin component (A) and an alkali metal ion-donating compound individually in separated portions of solvent, followed by combining the resulting solutions or dispersions to form a dispersion of a resin composition, and a method comprising dissolving or dispersing a resin component (A) and an alkali metal ion-donating compound in the same portion of solvent to form a dispersion of a resin composition. When the resin component (A) is a mixture of a resin component (A2) having hydroxyl groups and a resin component (A3) having carboxyl groups, the resin component (A2) and the resin component (A3) may be dissolved or dispersed individually in separated portions of solvent or, alternatively, in the same portion of solvent.

When a dispersion of a resin composition is prepared by using clay mineral as the alkali metal ion-donating compound, it is desirable to disperse the clay mineral by a high-pressure dispersion process in order to swell and cleave the clay mineral fully in the solvent. The high-pressure dispersion treatment used herein is a treatment method comprising forcing a liquid mixture composed of clay mineral and a solvent to pass through capillary tubes at high speed and then combining the flows of the liquid mixture, thereby causing the flows to collide with each other or against the inner walls of the capillary tubes to apply high shear and/or high pressure to the liquid mixture. In the high-pressure dispersion treatment, it is desirable to cause the liquid mixture to pass through capillary tubes with a diameter of from about 1 µm to about 1000 µm so that a maximum pressure of 100 kgf/cm$^2$ or more is applied to the liquid mixture. The maximum pressure is more preferably 500 kgf/cm$^2$ or more, particularly preferably 1000 kgf/cm$^2$ or more. The maximum speed of the liquid mixture at which the liquid mixture arrives during it passes through capillary tubes is preferably not less than 100 m/s and the rate of heat transfer due to pressure loss is preferably not less than 100 kcal/hr. The high-pressure dispersion treatment can be conducted by use of a high-pressure dispersing apparatus, such as an ultrahigh-pressure homogeniser manufactured by Microfluidics Corporation (commercial name: MICRO-FLUIDIZER), NANOMIZER manufactured by Nanomizer Inc., a Manton Gaulin type high-pressure dispersing device, and Homogenizer manufactured by Izumi Food Machinery Co., Ltd. The liquid which is subjected to the high-pressure dispersion treatment may contain the resin component (A).

It is desirable to add a surfactant to the dispersion liquid of the resin composition. By forming a precursor film (D) through application of a dispersion liquid of a resin composition containing a surfactant to a substrate, it is possible to improve the adhesion between the precursor film (D) and the substrate. The content of the surfactant is typically from 0.001 to 5 based on 100% by weight of the dispersion liquid of the resin composition. Addition of too a small amount of surfactant will result in an insufficient effect of improving the adhesion. On the other hand, addition of too a large amount of surfactant will cause deterioration in gas barrier properties.

As the surfactant, conventional surfactants such as anionic surfactants, cationic surfactants, amphoteric surfactants and nonionic surfactants may be used. In particular, it is desirable, from the viewpoint of improvement in adhesion, to use alkali metal salts of carboxylic acids with an alkyl chain having from 6 to 24 carbon atoms, ether type nonionic surfactants (silicone-based nonionic surfactants) such as polydimethylsiloxane-polyoxyethylene copolymers, or fluorine type nonionic surfactants (fluorine-containing nonionic surfactants) such as perfluoroalkyl ethylene oxide compounds.

The precursor film (D) used in the method of the first aspect of the present invention can be produced by a method which includes melt-kneading a resin component (A) and an alkali metal ion-donating compound to yield a resin composition (C) and converting the resin composition (C) into a film by extrusion, injection molding, compression molding, etc. It is also possible to form a precursor film (D) by a method in which a resin composition dispersion liquid prepared through dispersion of a resin composition (C) containing a resin component (A) and alkali metal ions (B) into a solvent is applied to a substrate and then the solvent is removed to form the precursor film (D) on the substrate. The latter method is preferred because it is easy to produce a precursor film (D) which is thin and uniform in thickness.

The second aspect of the present invention is directed to a method for producing a layered structure including a resin film and a substrate having thereon the resin film, including:

applying a liquid to a substrate, the liquid having been prepared by dispersing a resin composition (C) which includes alkali metal ions (B) and a resin component (A) with hydroxyl groups and carboxyl groups and satisfies conditions (1) and (2) given below in a solvent, removing the solvent from the liquid applied to form a precursor film (D') on the substrate, and subjecting the precursor film (D') to the following treatments together with the substrate:

dry heating treatment comprising holding the precursor film under an atmosphere characterized by a temperature not lower than 100° C. and a water vapor concentration less than 50 g/m$^3$, wet heating treatment comprising holding the precursor film resulting from the dry heating treatment under an atmosphere characterized by a temperature not lower than 100° C. and a water vapor concentration more than 290 g/m$^3$ or in water at a temperature not lower than 80° C., and drying the precursor film resulting from the wet heating treatment to form a resin film on the substrate:

condition (1): the ratio of the number of the hydroxyl groups to the number of the carboxyl groups in the resin component (A) is from 30:70 to 95/5 (hydroxyl groups: carboxyl groups), condition (2): the weight of the alkali metal ions (B) contained in the resin composition (C) is from 0.2% to 5% (from 2,000 ppm to 50,000 ppm) of the weight of the resin component (A).

The material which forms the substrate may be, but is not particularly limited to, metal, resin, wood, ceramic and glass. The form of the substrate may be, but is not particularly limited to, paper, woven fabric, nonwoven fabric and film. Either thermoplastic resin or thermosetting resin can be used as the resin. In the production of a layered article for use in packaging application, it is desirable to use a substrate made of thermoplastic resin. Examples of the thermoplastic resin include polyolefin such as low density polyethylene, high density polyethylene, linear low density polyethylene, ethylene-propylene copolymers, ethylene-butene copolymers, ethylene-hexene copolymers, ethylene-octene copolymers, polypropylene (PP), ethylene-vinyl acetate copolymers, ethylene-methyl methacrylate copolymers and polyolefin-based ionomer resins; polyester resins such as polyethylene terephthalate, polybutylene terephthalate and polyethylene naphthalate; amide resins such as Nylon-6 (Ny-6), Nylon-6,6, m-xylenediamine-adipic acid polycondensates, polymethyl methacrylimide and polymetaxylylene adipamide (MXD6-Ny); acrylic resins such as polymethyl methacrylate; styrene homopolymers, acrylonitrile homopolymers, styrene-acrylonitrile copolymers, styrene-acrylonitrile-butadiene copolymers; hydrophobicized cellulose resins such as cellulose triacetate and cellulose diacetate; halogen-containing resins such as polyvinyl chloride, polyvinylidene chloride and polyvinylidene fluoride; hydrogen boning resins having a hydroxyl group weight fraction of from 20 to 60% such as polyvinyl alcohol, ethylene-vinyl alcohol copolymers (EVOH) and cellulose derivatives; and polycarbonate resins, polysulfone resins, polyethersulfone resins, polyether ether ketone resins, polyphenylene oxide resins and polymethylene oxide resins. Examples of the aforesaid thermosetting resin include phenol resin, melamine resin and urea resin. In the production of a layered film, the substrate may be any one selected from non-oriented film, uniaxially oriented film and biaxially oriented film. However, preferred are biaxially oriented films made of polypropylene, polyester resin or amide-based resin, or layered articles made of two or more kinds of biaxially oriented films laminated to each other. The substrate may be a multilayer film such as Ny-6/MXD6-Ny/Ny-6 film and PP/EVOH/PP film. Further, films with aluminum, alumina or silica or the like deposited thereon may also be used.

One example of preferable substrate is a substrate having, on at least one side thereof, a heat-seal layer made of resin. Specific examples of the resin constituting the heat-seal layer include polyolefin resins such as low density polyethylene, high density polyethylene, linear low density polyethylene, ethylene-propylene copolymers, ethylene-butene copolymers, ethylene-hexene copolymers, ethylene-4-methyl-1-pentene copolymers, ethylene-octene copolymers, polypropylene, ethylene-vinyl acetate copolymers, ethylene-methyl methacrylate copolymers, ethylene-methyl acrylate copolymers, ethylene-acrylic acid copolymers and polyolefin-based ionomer resins, polyacrylonitrile resins, and polyester resins. By using such a substrate and constituting a layered article so as to form one surface from a heat-seal layer and the other surface from a resin film of a resin composition (C), it is possible to obtain a layered article resistant to oxidization even under exposure to high temperatures in the presence of oxygen.

A substrate with a heat-seal layer can be produced, for example, by a method comprising coextrusion of a resin for forming the heat-seal layer and a resin for forming the substrate, a method comprising applying, to the substrate, a solution prepared by dissolving a resin for forming the heat-seal layer in a solvent, followed by removal of the solvent to form the heat-seal layer on the substrate, a method comprising extrusion-lamination of a resin for forming the heat-seal layer onto the substrate, and a method comprising dry-lamination of a heat-sealable resin film or sheet with the substrate. The substrate's surface on which the heat-seal layer is to be disposed may have been subjected to various types of pre-treatment such as corona treatment, ozone treatment, electron beam treatment and application of an anchor coating agent. Examples of such an anchor coating agent include ethyleneimine-based anchor coating agents and two-component curable urethane-based anchor coating agents.

When an anchor coat layer or a precursor film (D') is formed by application of liquid, gravure methods such as the direct gravure method and the reverse gravure method, roll coating methods such as the two-roll beat coating method and the bottom-feed three-roll reverse coating method, the doctor knife method, the die coating method, the bar coating method, the dipping method and the spray coating method may be used. In order to form a layer uniform in thickness, it is desirable to use the gravure method.

From the viewpoints of gas barrier properties of a resulting resin layer and cost, the thickness of the precursor film (D') is typically from 0.01 µm to 100 µm, and preferably from 0.01 µm to 5 µm.

By the method for producing a layered article of the present invention, it is also possible to produce a layered article in which a clay mineral layer is formed adjacent to the resin layer formed on the substrate. The clay mineral layer is a layer which is composed substantially only of clay mineral. As the clay mineral for forming the clay mineral layer, clay minerals provided previously as examples of the alkali metal ion-donating compound contained in the resin composition (C) may be used. The clay mineral layer can be formed by applying a dispersion liquid prepared by dispersing clay mineral in a solvent on the precursor film (D') formed on the substrate, then removing the solvent, and further conducting dry heating treatment, wet heating treatment and drying treatment for treating the precursor film (D'). Alternatively, the clay mineral layer can also be formed by applying a dispersion liquid prepared by dispersing clay mineral in a solvent to a resin film formed by subjecting the precursor film (D') to dry heating treatment, wet heating treatment and drying treatment, followed by removal of the solvent. From the viewpoint of gas barrier properties of a resulting layered article, it is preferable to form, on the clay mineral layer formed on the resin film, an additional resin layer. The resin layer may be formed on one side or both sides of the substrate and may be formed so as to cover the substrate partly or entirely.

In the present invention, a precursor film (D) or (D') formed of a resin composition (C) including a resin component (A) and alkali metal ions (B) is subjected to dry heating treatment in which the precursor film is held under an atmosphere characterized by a temperature not lower than 100° C. and a water vapor concentration less than 50 g/m$^3$. The dry heating treatment temperature is preferably from 120° C. to 200° C. The dry heating treatment time is typically from one second to one hour. The water vapor concentration in the atmosphere during the dry heating treatment is preferably from 0 to 40 g/m$^3$.

The resin film which has experienced the dry heating treatment is then subjected to wet heating treatment in which the resin film is held under an atmosphere characterized by a temperature not lower than 100° C. and a water vapor concentration more than 290 g/m$^3$ or in water at a temperature not lower than 80° C. The wet heating treatment time is typically from one second to one hour. In the treatment under an atmosphere characterized by a temperature not lower than 100° C. and a water vapor concentration more than 290 g/m$^3$, the temperature is preferably within the range from 120° C. to 200° C. and the water vapor concentration is preferably within the range from 500 to 20,000 g/m$^3$. Before the wet heating treatment, the resin film resulting from the dry heating treatment may be subjected to aging, for example, at 23° C. and 50% RH.

The drying treatment after the wet heating treatment is performed in order to remove the moisture given to the resin film through the wet heating treatment. Typically, the resin film is held under conditions characterized by a humidity up to 50% RH and a temperature from 20° C. to 100° C. for a period of time of from one second to 24 hours.

By the methods of the present invention, it is possible to produce a resin film and a layered article which are excellent in gas barrier properties under high humidity conditions. Layered articles produced by the method of the present invention are suitably used as packaging materials for boiling or retorting due to their excellent whitening resistance at boiling or retorting.

EXAMPLES

The invention is described in detail below with reference to Examples.

First, methods for measuring physical properties and the like are described.

<Thickness Measurement>

Thicknesses of not less than 0.5 µm were measured by means of a commercially available digital thickness measuring device (contact-type thickness measuring device, trade name: Ultra-High Precision Deci-Micro Head MH-15M, manufactured by Nihon Kogaku K.K.). Thicknesses less than 0.5 µm were determined through cross-sectional observation with a transmission electron microscope (TEM).

<Particle Diameter Measurement>

The particle diameter was measured using a laser diffraction/scattering particle size distribution analyzer (LA910, manufactured by HORIBA, Ltd.). The average particle diameter of clay mineral in a resin composition dispersion liquid (1) mentioned later was measured by the paste cell method at an optical path length of 50 µm. Further, the average particle diameter of the clay mineral in a diluted liquid of the dispersion liquid (1) was measured by the flow cell method at an optical path length of 4 mm. In both the measurements, the average particle diameters determined were the same. This fact made certain that the clay mineral in the dispersion liquid was fully swollen and cleaved. The value obtained was considered as the average particle diameter of the clay mineral in a resin film.

<Measurement of the Ratio of the Number of Hydroxyl Groups to the Number of Carboxyl Groups in Resin Component (A)>

A polyvinyl alcohol (perfectly saponified product) and a polyacrylic acid were used as the resin component (A2) having hydroxyl groups and the resin component (A3) having carboxyl groups, respectively. The number of hydroxyl groups in the polyvinyl alcohol and the number of carboxyl groups in the polyacrylic acid were calculated from the formulas given below and then their ratio was calculated.

The number of hydroxyl groups=(Amount of resin component (A2) added)/(molecular weight per monomer unit constituting resin component (A2))

The number of carboxyl groups=(Amount of resin component (A3) added)/(molecular weight per monomer unit constituting resin component (A3))

<Measurement of the Combined Weight of Hydroxyl Groups and Carboxyl Groups in Resin Component (A)>

A polyvinyl alcohol (perfectly saponified product) and a polyacrylic acid were used as the resin component (A2) having hydroxyl groups and the resin component (A3) having carboxyl groups, respectively. The weight of hydroxyl groups and the weight of carboxyl groups were calculated by the formulas given below and they were summed.

The weight of hydroxyl groups=(17/(molecular weight per monomer unit constituting resin component (A2))×(weight of resin component (A2) added/weight of resin component (A) added)

The weight of carboxyl groups=(45/(molecular weight per monomer unit constituting resin component (A3))×(weight of resin component (A3) added/weight of resin component (A) added)

<Measurement of Alkali Metal Ion Concentration>

The sodium ion concentration of the entire layered article was measured using an inductively coupled plasma emission spectroscopy (Optima 3000, manufactured by Perkin Elmer). Then, the sodium ion concentration in the resin film was calculated by subtracting the sodium ion concentration in the layer or layers other than the resin layer from the sodium ion concentration of the entire layered article. A sample was prepared by the following procedure. One-gram portions were sampled from the layered article and the substrate, respectively. To each sample, 1 ml of 96% sulfuric acid was added, followed by ashing in an electric furnace. The residue was dissolved in 10 ml of 5% hydrochloric acid. The resulting solution was placed in the inductively coupled plasma emission spectroscopy. Thus, the sodium ion concentrations of the samples were measured and then their difference was calculated.

<Aspect Ratio Calculation>

The diffraction measurement of a clay mineral was conducted by the powder method using an X-ray diffraction analyzer (XD-5A, manufactured by Shimadzu Corp.). Thus, the unit thickness "a" of the clay mineral was determined. Using an average particle diameter "L" measured by the method described above, the aspect ratio "Z" of the clay mineral was calculated from an equation $Z=L/a$. An X-ray diffraction measurement conducted for a material obtained by drying the resin composition dispersion liquid (1) revealed that the interplanar spacing of the clay mineral was enlarged.

<Dry Heating Treatment>

A layered article sized 210 mm by 300 mm was heat treated in an oven conditioned at a temperature of 150° C. and a water vapor concentration of 5 g/m$^3$.

<Wet Heating Treatment>

Using a compact retorting autoclave (RK-3030, manufactured by ALP Corp.), a layered article sized 210 mm by 300 mm was subjected to wet heating treatment under a water vapor atmosphere at 120° C. for a predetermined period of time. The water vapor concentration was 1,113 g/m$^3$.

<Drying Treatment>

A layered article sized 210 mm by 300 mm was kept at rest for 24 hours under an atmosphere at 23° C. and 50% RH.

<Oxygen Permeability Measurement>

The oxygen permeability was measured in accordance with JIS K7126 at 23° C. and 90% RH by use of a supersensitive oxygen permeability analyzer (OX-TRAN ML, manufactured by MOCON).

<Preparation of Resin Composition Dispersion Liquid>

(1) Preparation of Resin Composition Dispersion Liquid (1)

In a dispersion pot (trade name: DESPA MH-L, manufactured by ASADA Iron Works, Co., Ltd.), 1300 g of ion exchange water (specific conductivity: 0.7 second/cm or less) and 130 g of polyvinyl alcohol (PVA 117H, manufactured by Kuraray Co., Ltd., degree of saponification: 99.6%, degree of polymerization: 1,700) were mixed together and heated up to 95° C. under slow stirring (1,500 rpm, peripheral speed: 4.1 m/min). After stirring the mixture at that temperature for 30 minutes to dissolve the polyvinyl alcohol, the mixture was cooled to 60° C. to yield an aqueous polyvinyl alcohol solution. While the aqueous polyvinyl alcohol solution (60° C.) was stirred under conditions the same those mentioned above, an aqueous alcohol solution prepared by mixing 122 g of 1-butanol, 122 g of isopropyl alcohol and 520 g of ion exchange water was dropped over 5 minutes. After the dropping, the stirring mode was switched to high-speed stirring (3,000 rpm, peripheral speed: 8.2 m/min) and then 82 g of high purity montmorillonite (trade name: Kunipia G, manufactured by Kunimine Industries Co., Ltd.) was added slowly. After the addition, stirring was continued at 60° C. for 60 minutes. Then, 243 g of isopropanol was further added over 15 minutes, followed by cooling of the mixture to room temperature. Thus, a liquid (1) containing clay mineral was obtained. To the liquid (1) containing clay mineral, 0.1% by weight, based on the weight of the dispersion liquid, of a nonionic surfactant (polydimethylsiloxane-polyoxyethylene copolymer, trade name: SH3746, manufactured by Dow Corning Toray Co., Ltd.) was added under slow-speed stirring (1,500 rpm, peripheral speed: 4.1 m/min). Then, the mixture was conditioned to pH6 by means of ion exchange resin. Thus, a clay mineral dispersion liquid (1) was prepared.

In another dispersion pot (trade name: DESPA MH-L, manufactured by ASADA Iron Works, Co., Ltd.), 1,067 g of ion exchange water (specific conductivity: 0.7 second/cm or less) and 33 g of polyacrylic acid (manufactured by Wako Pure Chemical Industries, Ltd., average molecular weight: 1,000,000) were mixed together and stirred at low speed (1,500 rpm, peripheral speed: 4.1 m/min) at room temperature. Thus, a solution of resin component (A3) was produced.

A liquid mixture was prepared by mixing 2,519 g of the clay mineral dispersion liquid (1) and 1,100 g of the solution of resin composition (A3) slowly under low-speed stirring (1,500 rpm, peripheral speed: 4.1 m/min). The liquid mixture was treated under a pressure of 1,100 kgf/cm$^2$ using a high-pressure dispersion instrument (trade name: Ultrahigh-Pressure Homogenizer M110-E/H, manufactured by Microfluidics Corp.). Thus, a resin composition dispersion liquid (1) was obtained. The montmorillonite cleaved in the resin composition dispersion liquid (1) had an average particle diameter "L" of 560 nm, a unit thickness "a", determined by powder x-ray diffraction, of 1.2156 nm, and an aspect ratio "Z" of 460.

(2) Preparation of Resin Composition Dispersion Liquid (2)

A resin composition dispersion liquid (2) was prepared in a manner the same as that in the preparation of the resin composition dispersion liquid (1) except for adjusting the pH of the clay mineral dispersion liquid (1) to 4.

(3) Preparation of Resin Composition Dispersion Liquid (3)

A resin composition dispersion liquid (3) was prepared in a manner the same as that in the preparation of the resin composition dispersion liquid (1) except for adjusting the pH of the clay mineral dispersion liquid (1) to 2.2.

(4) Preparation of Resin Composition Dispersion Liquid (4)

A resin composition dispersion liquid (4) was prepared by further adding 0.32 g of sodium hypophosphite to a 100-gram portion of the resin composition dispersion liquid (3).

Example 1

A 15-μm thick biaxially oriented Nylon (ONy) film (trade name: ON-U, manufactured by Unitika Ltd.), one surface of which had been corona-treated, was used as a substrate. To the corona-treated surface of the substrate, the resin composition dispersion liquid (1) was gravure coated by the microgravure coating method (the number of gravure lines: 150) at a coating speed of 3 m/min by means of a test coater (manufactured by Yasui Seiki Co.). Drying of the coated substrate at 100° C. resulted in a layered article (1') composed of the substrate and a resin film disposed thereon. The thickness of this resin film was 0.4 μm and the Na content in the resin film was 0.7% (7,000 ppm). The resulting layered article (1') was subjected to dry heating treatment, followed by aging for 24 hours under an atmosphere at 23° C., 50% RH. Subsequently, the layered article was subjected to wet heating treatment for 60 minutes, followed by drying treatment. Thus, a layered article (1) was produced. Then, the oxygen permeability of the layered article (1) was measured. The results are shown in Table 1.

Example 2

A layered article (2') was produced in a manner the same as that in Example 1, except for using the resin composition dispersion liquid (2) instead of the resin composition dispersion liquid (1) in Example 1. The thickness of this resin film was 0.4 μm and the Na content in the resin film was 0.4% (4,000 ppm). The resulting layered article (2') was subjected to dry heating treatment, followed by aging for 24 hours under an atmosphere at 23° C., 50% RH. Subsequently, the layered article was subjected to wet heating treatment for 60 minutes, followed by drying treatment. Thus, a layered article (2) was produced. Then, the oxygen permeability of the layered article (2) was measured. The results are shown in Table 1.

Example 3

A layered article (3') was produced in a manner the same as that in Example 1, except for using the resin composition dispersion liquid (4) instead of the resin composition dispersion liquid (1) in Example 1. The thickness of this resin film was 0.4 μm and the Na content in the resin film was 1.3% (13,000 ppm). The resulting layered article (3') was subjected to dry heating treatment, followed by aging for 24 hours under an atmosphere at 23° C., 50% RH. Subsequently, the layered article was subjected to wet heating treatment for 60 minutes, followed by drying treatment. Thus, a layered article (3) was produced. Then, the oxygen permeability of the layered article (3) was measured. The results are shown in Table 1.

Example 4

The layered article (1') obtained in Example 1 was subjected to dry heating treatment, followed by aging for 24 hours under an atmosphere at 23° C., 50% RH. Subsequently, the layered article was subjected to wet heating treatment for one minute, followed by drying treatment. Thus, a layered article (4) was produced. Then, the oxygen permeability of the layered article (4) was measured. The results are shown in Table 1.

Comparative Example 1

The layered article (1') obtained in Example 1, the article being composed of the substrate and a resin film disposed thereon, was subjected to dry heating treatment, followed by aging for 24 hours under an atmosphere at 23° C., 50% RH. The oxygen permeability of this layered article was measured and the result is shown in Table 1.

Comparative Example 2

The layered article (1') obtained in Example 1, the article being composed of the substrate and a resin film disposed thereon, was subjected to wet heating treatment, followed by aging for 24 hours under an atmosphere at 23° C., 50% RH. The oxygen permeability of this layered article was measured and the result is shown in Table 1.

Comparative Example 3

A layered article composed of a substrate and a resin layer disposed thereon was produced in a manner the same as that in Example 1, except for using the resin composition dispersion liquid (3) instead of the resin composition dispersion liquid (1) in Example 1. The thickness of this resin film was 0.4 μm and the Na content in the resin film was 0.150 (1,500 ppm). The resulting layered article was subjected to dry heating treatment, followed by aging for 24 hours under an atmosphere at 23° C., 50% RH. Subsequently, the layered article was subjected to wet heating treatment, followed by dry heating treatment. Thus, a layered article was produced. Then, the oxygen permeability of the layered article was measured.

The results are shown in Table 1.

Comparative Example 4

The layered article (1') obtained in Example 1, the article being composed of the substrate and a resin film disposed thereon, was subjected first to wet heating treatment, followed by aging for 24 hours under an atmosphere at 23° C., 50% RH and further dry heating treatment. Then, the oxygen permeability of the layered article was measured. The results are shown in Table 1.

TABLE 1

| | Na content (ppm) | Number ratio of hydroxyl groups to carboxyl groups in resin component (A) | Combined amount of hydroxyl groups and carboxyl groups in resin component (A) (% by weight) | Treatment | | | Oxygen permeability (cc/m$^2$·day·atm) | Remarks |
|---|---|---|---|---|---|---|---|---|
| | | | | Dry heating | Wet heating | Drying | | |
| Example 1 | 7000 | 86/14 | 43.4 | Yes | Yes | Yes | 1.2 | Wet heating for 60 min. |
| Example 2 | 4000 | 86/14 | 43.4 | Yes | Yes | Yes | 2.3 | Wet heating for 60 min. |
| Example 3 | 13000 | 86/14 | 43.4 | Yes | Yes | Yes | 3.0 | Wet heating for 60 min. |
| Example 4 | 7000 | 86/14 | 43.4 | Yes | Yes | Yes | 1.3 | Wet heating for 1 min. |
| Comparative Example 1 | 7000 | 86/14 | 43.4 | Yes | No | Yes | 5.2 | |
| Comparative Example 2 | 7000 | 86/14 | 43.4 | No | Yes | Yes | >10 | |
| Comparative Example 3 | 1500 | 86/14 | 43.4 | Yes | Yes | Yes | >10 | |
| Comparative Example 4 | 7000 | 86/14 | 43.4 | Yes | Yes | Yes | >10 | Wet heating was followed by drying and then dry heating |

<Retort Evaluation>

A 70-μm thick non-oriented polypropylene (CPP) film (trade name: PYLEN FILM-CT P1146; manufactured by Toyobo Co., Ltd., oxygen permeability: about 1,400 cc/m$^2$·day·atm) as a heat seal layer was dry-laminated onto the substrate of the layered product (4) obtained in Example 4. Thus, a laminated layered article (1) was obtained. The oxygen permeability of the laminated layered article (1) was measured to be 0.9 cc/m$^2$·day·atm. Subsequently, using a compact retorting autoclave (RK-3030, manufactured by ALP Corp.), the laminated layered article (1) was retort-treated under a water vapor atmosphere at 120° C. for 60 minutes. The appearance of the laminated layered article (1) after the treatment was good and was the same as that before the retorting.

For comparison, a laminated layered article (2) was produced by dry lamination of a heat-seal layer onto the surface of the layered article (4) obtained in Example 4 opposite with the substrate. The laminated layered article was then subjected to retort-treatment and further drying treatment. The laminated layered article (2) after the treatment was whitened in comparison to that before being retorted.

What is claimed is:

1. A method for producing a resin film, comprising subjecting a precursor film (D) made of a resin composition (C) which comprises a resin component (A) with hydroxyl groups and carboxyl groups and alkali metal ions (B) comprising at least one species selected from a sodium ion, and a lithium ion, and satisfies conditions (1) and (2) given below, the resin composition further comprising clay minerals, to the following treatments:
   dry heating treatment comprising holding the precursor film under an atmosphere characterized by a temperature not lower than 100° C. and a water vapor concentration less than 50 g/m$^3$,
   wet heating treatment comprising holding the precursor film resulting from the dry heating treatment under an atmosphere characterized by a temperature not lower than 100° C. and a water vapor concentration more than 290 g/m$^3$, and
   drying the precursor film resulting from the wet heating treatment:
   condition (1): the ratio of the number of the hydroxyl groups to the number of the carboxyl groups in the resin component (A) is from 30:70 to 95:5 (hydroxyl groups: carboxyl groups),
   condition (2): the weight of the alkali metal ions (B) contained in the resin composition (C) is from 0.2% to 5% of the weight of the resin component (A), wherein the resin component (A) comprises a resin component (A2) comprising at least one species selected from polyvinyl alcohols, and polysaccharides, having hydroxyl groups and a resin component (A3) comprising at least one species selected from polyacrylic acid, polymethacrylic acid, partially neutralized polyacrylic acid, and partially neutralized polymethacrylic acid; and wherein the clay minerals are a montmorillonite.

2. The method according to claim 1, wherein the combined weight of the hydroxyl groups and the carboxyl groups in the resin component (A) is from 30% to 60% of the weight of the resin component (A).

3. The method according to claim 1, wherein the resin component (A2) is a polyvinyl alcohol.

4. The method according to claim 3, wherein the combined weight of the hydroxyl groups and the carboxyl groups in the resin component (A) is from 30% to 60% of the weight of the resin component (A).

5. The method according to claim 1, wherein the alkali metal ions (B) are sodium ions.

6. The method according to claim 1, wherein the wet heating treatment comprises holding the precursor film resulting from the dry heating treatment under an atmosphere characterized by a temperature from 120° C. to 200° C. and a water vapor concentration from 500 to 20,000 g/m$^3$.

7. A method for producing a layered structure comprising a resin film and a substrate having thereon the resin film, comprising:
   applying a liquid to a substrate, the liquid having been prepared by dispersing a resin composition (C) which comprises a resin component (A) with hydroxyl groups and carboxyl groups and alkali metal ions (B) comprising at least one species selected from a sodium ion, and a lithium ion, and satisfies conditions (1) and (2) given below, the resin composition further comprising clay minerals, in a solvent, removing the solvent from the applied liquid to form a precursor film (D') on the substrate, and subjecting the precursor film (D') to the following treatments together with the substrate:

dry heating treatment comprising holding the precursor film under an atmosphere characterized by a temperature not lower than 100° C. and a water vapor concentration less than 50 g/m$^3$, wet heating treatment comprising holding the precursor film resulting from the dry heating treatment under an atmosphere characterized by a temperature not lower than 100° C. and a water vapor concentration more than 290 g/m$^3$, and drying the precursor film resulting from the wet heating treatment:

condition (1): the ratio of the number of the hydroxyl groups to the number of the carboxyl groups in the resin component (A) is from 30:70 to 95:5 (hydroxyl groups: carboxyl groups), condition (2): the weight of the alkali metal ions (B) contained in the resin composition (C) is from 0.2% to 5% of the weight of the resin component (A), wherein the resin component (A) comprises a resin component (A2) comprising at least one species selected from polyvinyl alcohols, and polysaccharides, having hydroxyl groups and a resin component (A3) comprising at least one species selected from polyacrylic acid, polymethacrylic acid, partially neutralized polyacrylic acid, and partially neutralized polymethacrylic acid; and wherein the clay minerals are a montmorillonite.

8. The method according to claim 7, wherein the resin component (A2) is a polyvinyl alcohol.

9. The method according to claim 7, wherein the alkali metal ions (B) are sodium ions.

10. The method according to claim 7, wherein the wet heating treatment comprises holding the precursor film resulting from the dry heating treatment under an atmosphere characterized by a temperature from 120° C. to 200° C. and a water vapor concentration from 500 to 20,000 g/m$^3$.

\* \* \* \* \*